US007181667B2

(12) United States Patent
Argyropoulos et al.

(10) Patent No.: US 7,181,667 B2
(45) Date of Patent: Feb. 20, 2007

(54) METHOD AND APPARATUS FOR MODULATING RADIO LINK CONTROL (RLC) ACK/NAK PERSISTENCE TO IMPROVE PERFORMANCE OF DATA TRAFFIC

(75) Inventors: Yiannis Argyropoulos, Atlanta, GA (US); Rajesh S. Pazhyannur, Lake Zurich, IL (US); Stavros Tzavidas, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 111 days.

(21) Appl. No.: 11/029,228

(22) Filed: Jan. 4, 2005

(65) Prior Publication Data

US 2006/0146831 A1  Jul. 6, 2006

(51) Int. Cl.
*H04L 1/18* (2006.01)

(52) U.S. Cl. .............. 714/748; 714/758; 714/751; 714/807; 370/232

(58) Field of Classification Search ................ 714/748, 714/751, 758, 807; 370/232
See application file for complete search history.

(56) References Cited

U.S. PATENT DOCUMENTS 6,145,110 A * 11/2000 Khayrallah ............... 714/752
6,473,399 B1   10/2002 Johansson et al.
6,731,623 B2 *  5/2004 Lee et al. ................. 370/349
6,978,143 B1 * 12/2005 Vialen ..................... 455/452.2
7,054,270 B2 *  5/2006 Yi et al. .................. 370/232
2002/0019232 A1  2/2002 Balachandran et al.

* cited by examiner

*Primary Examiner*—Albert Decady
*Assistant Examiner*—Esaw Abraham

(57) ABSTRACT

Methods and apparatus are provided for modulating ACK/NACK persistence to improve data traffic performance. In one implementation, a method for control of automatic repeat requests between a transmitting terminal (102) and a receiving terminal (104) comprises: defining (1404) a buffer window of a buffer, the window to buffer multiple higher layer data blocks each segmented into multiple physical layer data blocks, the window beginning at a current higher layer block in which at least one physical layer block has not been received; obtaining (1406) an indication of whether physical layer blocks are completely received; determining (1408), based on the obtaining step, that a subsequent higher layer block within the window has been completely received; and discarding (1410) the current higher layer block when a time delay of the current higher layer block exceeds an estimate of a delay tolerance corresponding to a higher layer application.

23 Claims, 9 Drawing Sheets

METHOD AND APPARATUS FOR MODULATING RADIO LINK CONTROL (RLC) ACK/NAK PERSISTENCE TO IMPROVE PERFORMANCE OF DATA TRAFFIC

FIELD OF THE INVENTION

The present invention relates generally to wireless communications systems, and more specifically to automatic repeat request (ARQ) mechanisms at the radio link layer to increase the reliability of wireless communications.

BACKGROUND OF THE INVENTION

In wireless packet data systems, such as Enhanced General Packet Radio Service (EGPRS) and Universal Mobile Telecommunication System (UTMS), a form of selective repeat automatic repeat request (ARQ) referred to as radio link control (RLC), or alternatively, radio link protocol (RLP), is used to reduce the packet loss rate seen by end-to-end applications by link layer retransmissions. The improvement in packet loss rate comes at the expense of increased delay and reduced link throughput due to retransmissions.

Higher layer data packets are segmented into RLC (or RLP) blocks depending on the modulation and coding scheme (MCS) used. RLC blocks are transmitted via the wireless channel to a receiving terminal. The receiving terminal replies with an acknowledgement (ACK) if the block was properly received or negative acknowledgement (NACK) if the block was received in error or not received. The NACK acts as a request to retransmit any blocks that were not received or received in error. Most RLC/RLP error recovery systems, such as used in EGPRS, are infinitely persistent, that is, there is no limit on the number of re-transmit attempts for a given block. Some systems are moderately persistent and limit the number of retransmission attempts. For example, with respect to RLP in code division multiple access (CDMA) systems using Telecommunications Industry Association (TIA) IS-2000, a receiving terminal simply drops a block if it is not correctly received after requesting NACKs 5 times. In another example, according to RLC for UTMS, after a retransmit count is exceeded at the transmitting terminal, if the block is still not received at the receiving terminal, the transmitting terminal drops the block and signals to the receiving terminal to move its receive window accordingly.

There are, however, an increasing number of applications that may prefer a higher packet loss at lower delay. For example, streaming voice/audio/data applications, push-to-talk (PTT), voice over Internet Protocol (VoIP) are all concerned with packet delay. Currently known infinitely persistent methods are not well suited to such applications. Likewise, known moderately persistent methods may not provide the desired quality of service (QoS) trade-off between delay and packet loss.

BRIEF DESCRIPTION OF THE DRAWINGS

The above and other aspects, features and advantages of the present invention will be more apparent from the following more particular description thereof, presented in conjunction with the following drawings.

Figure 1:
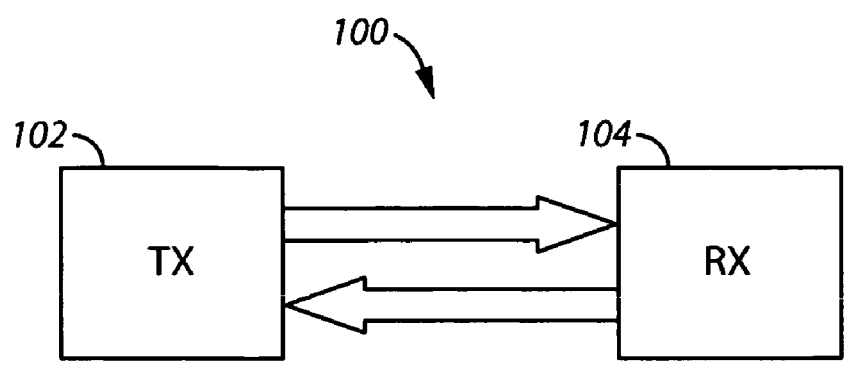
FIG. 1 is a diagram of a communication system in which several embodiments may be employed.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of the preferred embodiments. The scope of the invention should be determined with reference to the claims.

According to several embodiments, a solution is provided to modulate radio link control (RLC) persistence of RLC data blocks or units (referred to generically as physical layer data blocks) based on delay requirements of a higher layer application, such as a link layer control (LLC) application or an Internet protocol (IP) application. In contrast, known protocols focus on the retransmission count rather than delay. Retransmission count is not necessarily a good estimate of delay due to the varying round trip delays depending on the distance between terminals and/or loading conditions. In further contrast, known systems focus on RLC block delay, not on a higher layer block (such as LLC block) delay. Such techniques provide improved throughput and free bandwidth while avoiding needless retransmission attempts. Accordingly, the solutions provided herein are well suited to applications that prefer a higher packet loss at lower delay, such as streaming voice/audio/data applications, push-to-talk (PTT) and voice over internet protocol (VoIP), for example. Many of the solutions provided do not require standardization efforts on different systems.

Thus, in a broad sense, one embodiment may be characterized as a method and means for accomplishing the method for control of automatic repeat requests between a transmitting terminal and a receiving terminal comprising:

defining a buffer window of a buffer at a communication device, the buffer window to buffer multiple higher layer data blocks, each higher layer data block segmented into multiple physical layer data blocks, the buffer window beginning at a current higher layer data block in which at least one physical layer data block has not been received; obtaining an indication of whether physical layer data blocks are completely received at the receiving terminal; determining, based on the obtaining step, that a subsequent higher layer data block within the buffer window has been completely received; and discarding the current higher layer data block when a time delay of the current higher layer data block exceeds an estimate of a delay tolerance corresponding to a higher layer application.

Likewise, in a broad sense, another embodiment may be characterized as an apparatus for use in control of automatic repeat requests from a transmitting terminal to a receiving terminal comprising: a buffer having a buffer window to buffer multiple higher layer data blocks, each higher layer data block segmented into multiple physical layer data blocks, the buffer window beginning at a current higher layer data block in which at least one physical layer data block has not been received; and a controller adapted to obtain an indication of whether physical layer data blocks are completely received and determine based on the indication that a subsequent higher layer data block within the buffer window has been completely received. The controller also adapted to cause the current higher layer data block to be discarded when a time delay of the current higher layer data block exceeds an estimate of a delay tolerance corresponding to a higher layer application.

Thus, solutions described herein provide for an intermediate ARQ solution between acknowledged (ACKed) and unacknowledged (NACKed) modes of operation that drops data blocks in a data link layer (e.g., RLC) when their time delay exceeds a delay tolerance corresponding to a higher layer. There is considerable overall benefit in dropping some delayed packets at the data link layer, given that higher layer mechanisms already exist to handle packet loss. This allows for improved throughput and frees bandwidth while avoiding needless retransmission attempts, which should be beneficial to applications that prefer a higher packet loss at lower delay. For example, in some systems, it is estimated that 15% of the bandwidth will be freed by preventing needless retransmission attempts.

Referring first to FIG. 1, a diagram is shown of a communication system in which several embodiments may be employed. A communication system 100 includes a first communication terminal 102 and a second communication terminal 104. Units of data (which may include substantive message information, control information, or both) are communicated from the first communication terminal 102 to the second communication terminal 104 over an appropriate communication medium. The units of data that are sent over the communication medium are generically referred to as "physical layer data units". A non-limiting example of a physical layer data unit is a protocol data unit (PDU); however, larger, smaller, or differently formatted data units are also applicable.

According to selective repeat automatic repeat request (ARQ) procedures, when the second communications terminal 104 detects that one or more of the physical layer data units has either not been received or has been received erroneously, it transmits to the first communications terminal 102 a request to retransmit those detected physical layer data units. In response, the first communication terminal 102 retransmits those physical layer data units. Thereafter, if the second communications terminal 104 does not receive the requested physical layer data units by a certain point in time, or if not all of the requested packets are correctly received, it sends another request to retransmit the remaining incorrectly or not received physical layer data units. Infinitely persistent ARQ controls would continue sending requests for an incompletely received packet until it was received without limiting the number of retransmit attempts. Some known moderately persistent ARQ controls would place a limit on the number of retransmit requests or attempts and simply drop the data unit if not received.

It is noted that the communication terminals are each capable of transmitting and receiving, i.e., they are transceivers. However, in the context of the retransmission controls described herein, when the first communication terminal 102 sends data to the second communication terminal 104, the first communication terminal 102 is referred to as the "transmitting terminal" and the second communication terminal 104 is referred to as the "receiving terminal" (even though both transmit and receive). It is further noted that in preferred form, the communication medium between the terminals 102 and 104 is a wireless radio communication medium; however, the embodiments described herein also apply to other lossy wireline and wireless communication mediums.

Figure 2:
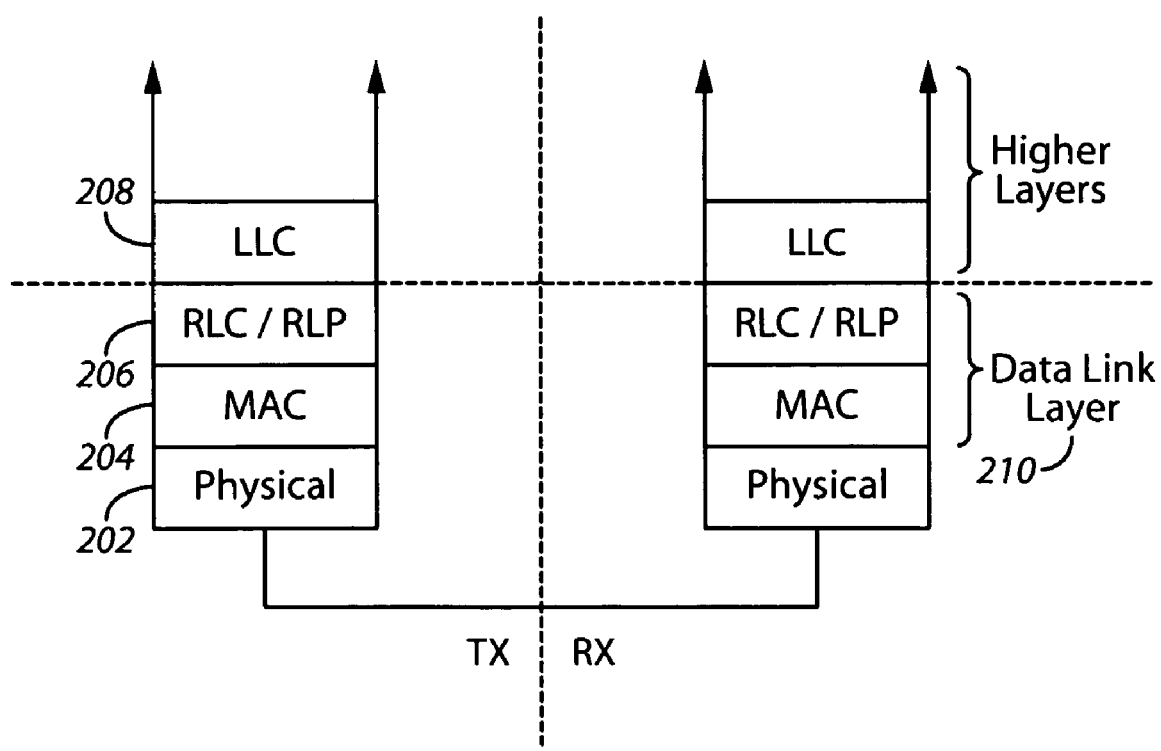
FIG. 2 is a diagram illustrating several lower level communication protocol layers that may be employed for communications in the system of FIG. 1.

Referring next to FIG. 2, a diagram is shown illustrating several lower level communication protocol layers that may be employed for communications in the system of FIG. 1. The radio interface is divided into several protocol layers, and communications terminals 102 and 104 use these protocol layers to orchestrate communications. There are corresponding protocol stacks for the transmitting terminal and the receiving terminal. Both protocol stacks include a physical layer 202, a medium access control (MAC) layer 204, a radio link control (RLC) layer 206 (alternately a radio link protocol (RLP) layer), and a logical link control (LLC) layer 208. The MAC layer 204 and the RLC layer 206 are referred together as the data link layer 210.

The physical layer 202 provides information transfer services over the radio/air interface and in several embodiments, performs the following functions: forward error correction encoding and decoding, macrodiversity distribution/combining, soft handover execution, error detection, multiplexing and demultiplexing of transport channels, mapping of transport channels onto physical channels, modulation and spreading/demodulation and despreading of physical channels, frequency and time synchronization, power control, RF processing, and other functions. The MAC layer 204 generally handles access to the physical link. For example, the MAC layer 204 functions include selecting an appropriate transport format for each transport channel depending on data rate, priority handling between data flows of one user and between data flows different users, scheduling of control messages, multiplexing and demultiplexing of higher layer blocks or packet data units (PDUs), and other functions. The RLC layer 206 is responsible for efficient use of the physical link on the radio interface and performs various functions including the establishment, release, and maintenance of an RLC connection, segmentation and reassembly of variable length, higher layer blocks (such as LLC blocks) into/from smaller RLC blocks, concatenation, error correction by retransmission (ARQ), in sequence delivery of higher layer blocks, duplicate detection, flow control, and other functions. Of interest in several embodiments, the RLC layer 206 performs automatic repeat request (ARQ) for data units transported over the communication medium. The LLC layer 208 is responsible for handling the virtual connection between communicating terminals and exist even when no physical resources are available between the two. Above the LLC layer 208 are various known network and application layers, such as the Internet protocol (IP) layer, the transmission control protocol (TCP) layer, and so on.

In the context of the solutions provided herein for modulating the RLC/RLP automatic repeat request (ARQ) persistence, the RLC layer 206 performs the ARQ functionality. That is, ARQ is performed based on the data units formed by the RLC layer 206, e.g., RLC data units or RLC blocks, and that are transmitted over the communication interface by the MAC layer 204 and the physical layer 202. At the transmitting terminal, higher layer data units, such as LLC blocks or PDUs, are segmented into RLC blocks for transmission, while at the receiving terminal, these RLC blocks are received and reassembled back into the higher layer blocks. It is noted that as used herein, the data units or blocks formed in the RLC layer 206 and which are transmitted over the communication interface and which ARQ methods are performed are referred generically as "physical layer data blocks". On the other hand, data blocks of the higher layers, such as the LLC layer 208, are referred to as "higher layer data blocks". According to several embodiments, a typical higher layer data block (e.g., an LLC PDU) is segmented into multiple physical layer data blocks (e.g., RLC PDUs).

As described above, in applications that prefer higher packet loss at lower delay, such as streaming applications, PTT, and VoIP, for example, infinitely persistent ARQ approaches are not desirable. Likewise, moderately persistent methods may not provide the desired quality of service (QoS) trade-off between delay and packet loss. According to several embodiments, the interaction between packet loss recovery efforts between the RLC layer 206 and the end-to-end or higher layer application is worth investigating. Generally, the operation between the IP layer and the RLC layer 206 is roughly as follows. An IP packet (also referred to as a network PDU or n-PDU) is passed to the subnetwork dependent convergence protocol (SNDCP) layer and LLC layer 208, which segments it if necessary. The LLC layer 208 outputs data blocks referred to as LLC frames or LLC PDUs to the RLC layer 206. The RLC layer 206 typically fragments each LLC data block into multiple blocks depending on the Modulation and Coding Scheme (MCS) used. The RLC layer 206 transmitter maintains a queue of blocks (typically from multiple LLCs) and continues to transmit until a certain maximum number (RLC window) is reached. On a periodic basis, the transmitting terminal requests an ACK/NACK packet from the receiver in order to determine if all transmitted RLC data blocks have been correctly received. In response, the receiving terminal transmits an ACK/NACK with information about the received and missing blocks.

In GPRS/EGPRS, the ARQ of the RLC layer is infinitely persistent in that there are no limits on how many times (or for how long) an RLC block will be retransmitted. This affects TCP behavior as follows: when RLC delay exceeds a threshold, the TCP end host times out and retransmits the IP packet. Given that the IP packet is going to be retransmitted there is little value in the RLC layer attempting to deliver blocks (packets) beyond a given threshold. In such cases, simply dropping the block and attempting to deliver subsequent blocks would yield much better TCP performance. Furthermore, it is known that TCP-Reno can recover from dropped blocks through Fast Recovery and Fast Retransmit mechanisms. This is an additional reason for RLC to drop blocks beyond a given time threshold instead of delivering excessively delayed blocks.

Furthermore, at the receiving terminal, the RLC layer 206 reassembles the RLC blocks back into LLC blocks and provides in-order delivery to the LLC layer 208. Such in-order delivery will result in additional RLC delays for an LLC block that is completely received when a previous LLC block has not yet been completely received since a completely received LLC block cannot be delivered until all previous LLC blocks are received and delivered. The in-order delivery of the LLC layer 208 typically results in an experience of larger delay and jitter at the IP layer. Once again, the application may prefer a less persistent RLC layer 206. Many end-to-end applications do not depend on successful receipt of all packets at the receiver, i.e., they are somewhat loss tolerant. However, the loss tolerance is lower than what the wireless link provides, thus requiring RLC to improve the packet loss rate. This is different from the TCP applications where the application is not loss tolerant. An example of loss tolerant applications requiring RLC could be low-bandwidth multi-media applications.

Accordingly, radio link control methods for ARQ are described herein where RLC blocks delayed beyond a delay tolerance of the higher layer application are dropped. In some embodiments, the decision to drop blocks is made at the transmitting terminal, while in other embodiments, the decision is made at the receiving terminal.

Figure 3:
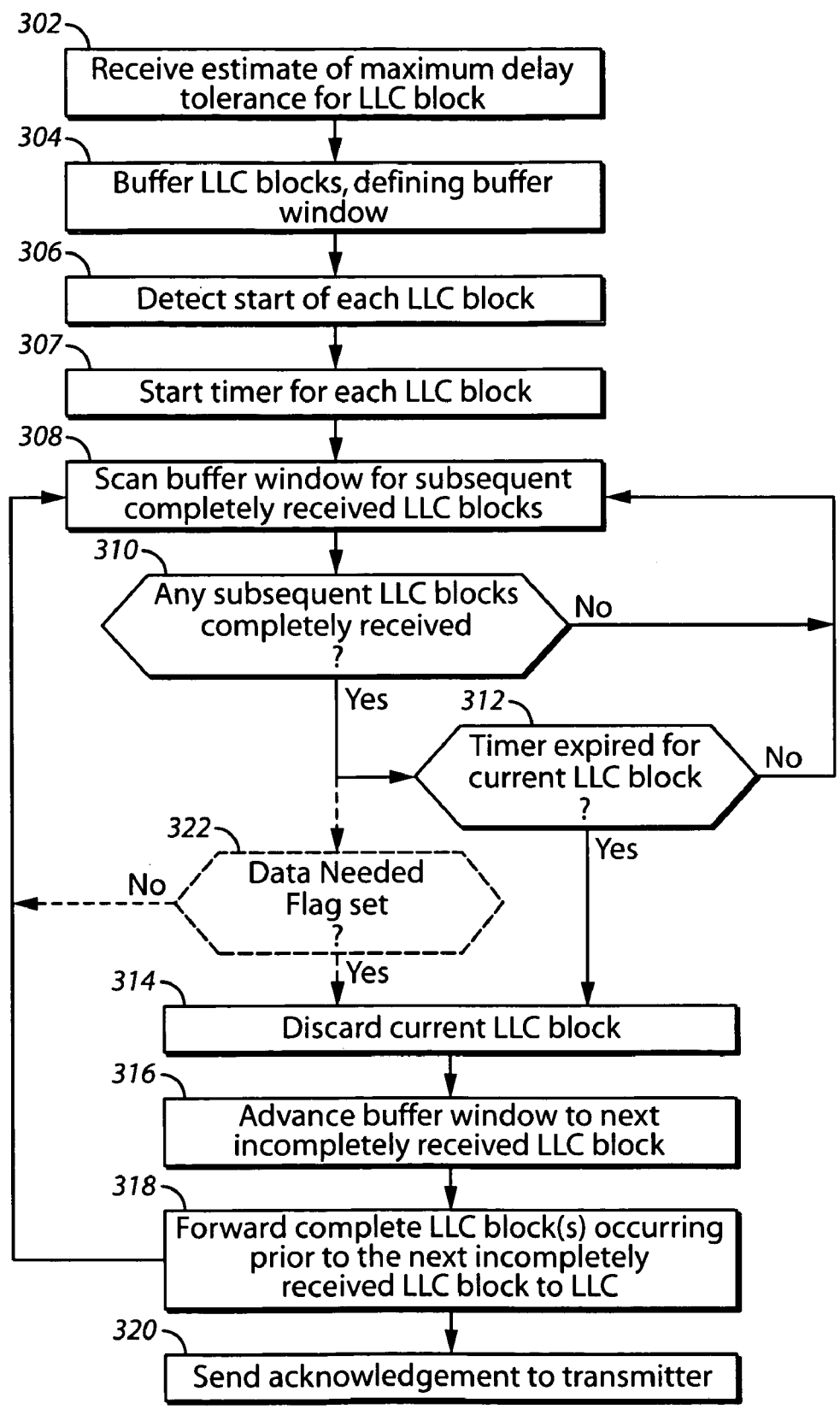
FIG. 3 is a flowchart of the steps performed in implementing radio link control at a receiving communication terminal according to one embodiment.

Referring next to FIG. 3, a flowchart is shown of the steps performed in implementing radio link control at a receiving communication terminal according to one embodiment. Concurrent reference will also be made to FIGS. 4–10, which are buffer diagrams illustrating several embodiments of radio link control.

This technique is generally performed at the receiving terminal and in preferred form is performed by the RLC layer 206; however, it is understood that this technique may be performed generically by the layer that is responsible for ARQ over the physical communication medium or interface, e.g., the data link layer. Generally, the receiving terminal maintains a timer for each LLC block (higher layer data block) that measures the delay until that LLC block is completely received. If new completely received LLC blocks exist in the receiving terminal's buffer and the delay for the current LLC block exceeds an estimate for the delay tolerance of the higher layer application, the receiving terminal drops the current LLC block, allowing the buffer window to advance. It is noted that as used throughout this specification, a timer refers to any device that determines time relative to a reference point in time. For example, in some embodiments, a timer is a discrete timer or counter. In another embodiment, the time of receipt of the LLC block is recorded and the difference between the current time and the time of receipt is used to implement a timer.

Initially, an estimate of delay tolerance for a given LLC block is received (Step 302). In preferred form, the estimate is for the maximum delay that can be tolerated for an LLC block (referred to as "maximum delay tolerance"). This estimate can be signaled to the RLC layer 206 by a higher layer on the receiver side, or it could be negotiated during the setup of the connection. It is noted that when the delay tolerance is signaled by a higher layer, this signaling does not necessarily happen only at the beginning of a session but can happen at any time. Additionally, the delay tolerance may be updated or altered from its initial valve. That is, the delay tolerance for each separate LLC block can change dynamically to reflect the changing requirements of the higher layer. In cases where negotiation or signaling between layers is not possible, a reasonable value for the delay tolerance can be calculated a priori, and built into the system, based on simulations and/or relevant experience.

Figure 4:
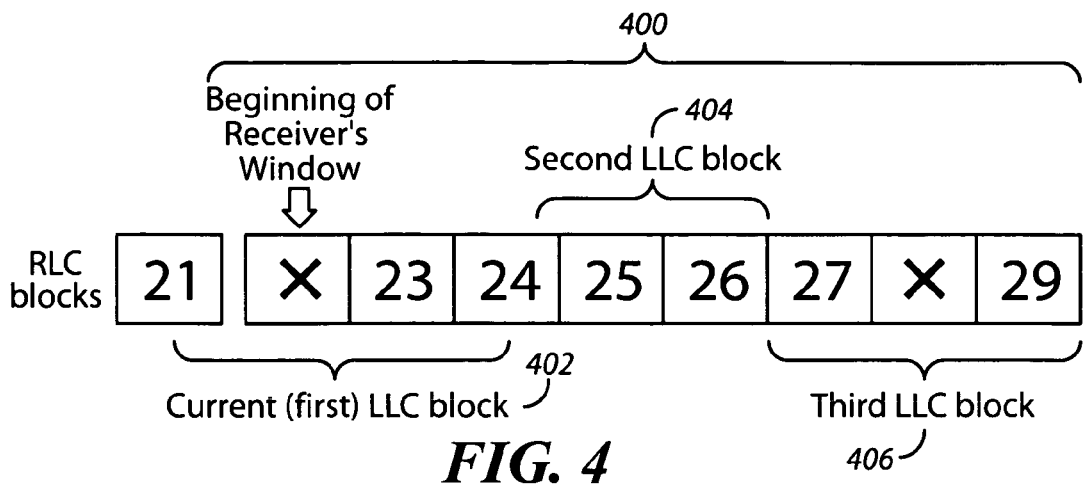
FIGS. 4–7 are buffer diagrams illustrating one embodiment of radio link control.

Additionally, all received RLC blocks are buffered for in-order delivery and reassembly in an RLC block buffer, the RLC block buffer defining a receive buffer window that begins with a current or sequentially earliest LLC block that is not completely received (Step 304). For example, a receive buffer window 400 of an RLC block buffer is represented in FIG. 4 and includes RLC blocks in sequential order, received or not, that make up a given LLC block. As illustrated in FIG. 4, a current or first LLC block 402 includes RLC blocks 21, 22, 23 and part of block 24; a second LLC block 404 includes part of RLC block 24 and also RLC blocks 25 and 26; and a third LLC block 406 includes RLC blocks 27, 28, 29. Note that RLC blocks not properly received are indicated with an "X". In preferred form, as illustrated in FIG. 4, the beginning of the receive buffer window 400 is at the location of a first incompletely received RLC block (e.g., RLC block 22) of the current or first incompletely received LLC block (e.g., LLC block 402). It is noted that although the receive buffer window 400 is illustrated as only including 3 LLC blocks, the window size may be sized to generally contain any desired number of LLC blocks.

It is noted that as illustrated in FIG. 4 (and also in FIGS. 5-10), the boundary between LLC blocks may occur within a given RLC block. For example, both the first LLC block 402 and the second LLC block 404 each include part of RLC block 24. In the other hand, the boundary between the second LLC block 404 and the third LLC block 406 is at the boundary between RLC blocks 26 and 27.

Figure 5:
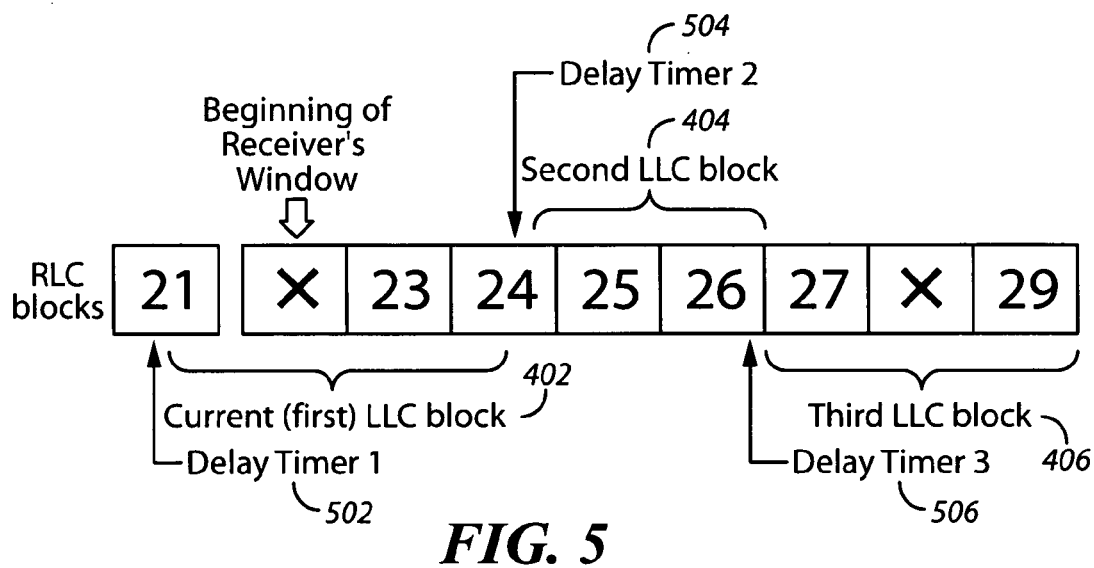

Furthermore, the start of every LLC block in the receive buffer window is detected (Step 306). This is performed, for example, by inspecting header data on each RLC block to identify boundaries between LLC blocks and this information is used in buffering the received RLC blocks in the receive buffer window for in-order delivery to the higher layer. Also, upon reception of the beginning of an LLC block, a timer is started that measures the delay in the reception of that particular LLC block (Step 307). This timer is referred to as a delay timer. The expiration value of the timer for each LLC block is set to the estimated delay tolerance at the receiving terminal for the higher layer application. In preferred form, the delay estimate is for the maximum delay tolerance acceptable by the higher layer application. For example, as illustrated in FIG. 5, a first delay timer 502 is started at the reception of RLC block 21 (the start of LLC block 402), a second delay timer 504 is started at the reception of RLC block 24 (the start of LLC block 404), and a third delay timer 506 is started at the reception of RLC block 27 (the start of LLC block 406). It is noted that when referred to as starting a timer, in some embodiments, a timer isn't necessarily started. For example, in one embodiment, the time of arrival at the RLC layer of the receiving terminal is stored for the RLC block at the beginning of each LLC block (e.g., the time of arrival is stored for each of RLC blocks 21, 24 and 27). By comparing the difference between the current time and the stored time, a timer is functionally implemented. In another embodiment, a counter is started upon the arrival of the first RLC block of each LLC block, the rate of increment/decrement corresponding to time.

Figure 6:
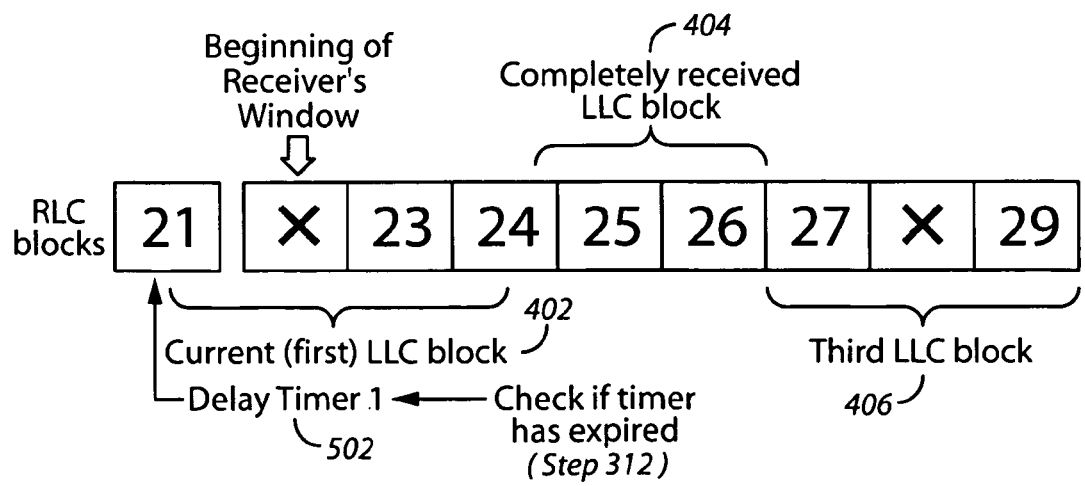

Next, the receive buffer is continuously scanned to detect any completely received LLC blocks subsequent to the current or first LLC block 402 (Step 308). Note that a completely received LLC block can exist at the receive buffer only if it comes later than the first or current LLC block. This is because, all LLC blocks that arrived earlier than the first LLC block 402 at the beginning of the receive buffer window have all been correctly received and have already been forwarded to the higher layer. For example, as shown in FIG. 6, the second LLC block 404 has been completely received, whereas the first LLC block 402 has not been completely received yet.

If there is a subsequent LLC block that is completely received in the receive buffer window when the first LLC block has not been completely received (Step 310), then the timer for the first LLC block is checked to see if it has expired. For example, based on information about whether transmitted RLC blocks are completely received, an RLC controller is able to determine if there is a subsequent LLC block that has been completely received. This is also shown in FIG. 6, where the first delay timer 502 is checked once the second LLC PDU 404 is completely received. As noted above, in some embodiments, a timer expires by comparing the difference between the current time and the time of arrival of the LLC block to the currently stored value of the delay tolerance (given that the delay tolerance for the LLC block may have been updated by the higher layer application depending on its changing needs). If the difference is greater than or equal to the delay tolerance, then the "timer" has expired. In another embodiment, a counter is started upon the arrival of the first RLC block of the LLC block. This "timer" expires when the counter reaches a value that corresponds to the delay tolerance.

If the delay timer for the current LLC block 402 has not expired (Step 312), then the receive buffer is continuously scanned (Steps 308 and 310 are repeated).

If the timer for the current LLC block has expired (Step 312), then the current or first LLC block is discarded (Step 314) and the receive buffer window is advanced to the next incompletely received LLC block (Step 316). In preferred form, the receive buffer window is advanced to begin at the first incompletely received RLC block of the next incompletely received LLC block, such that the next incompletely received LLC block now becomes the "new" current or first LLC block.

Figure 7:
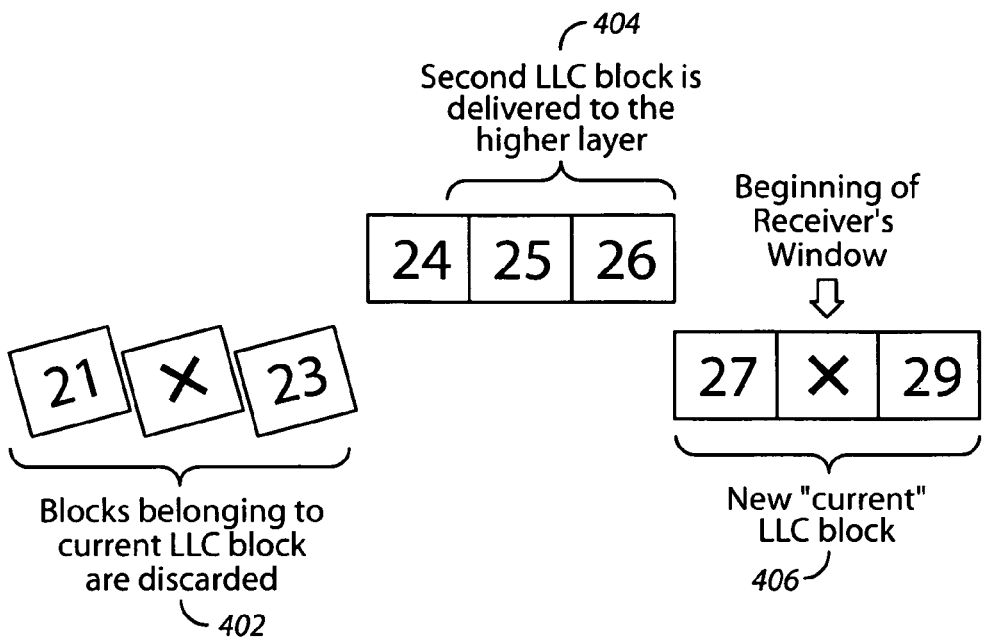

In advancing the buffer window, if the completely received subsequent LLC block occurs sequentially before the next incompletely received LLC block, the completely received subsequent LLC block and any other completely received LLC blocks occurring prior to the next incompletely received LLC block are forwarded to the LLC layer (Step 318). In forwarding a subsequent completely received LLC block to the higher layer, the RLC blocks of the subsequent completely received LLC block (e.g., LLC block 404) are reassembled into the complete LLC block and passed to the LLC layer. This procedure is illustrated in FIG. 7. For example, since LLC block 404 was completely received while the first LLC block 402 is incompletely received, and the timer for LLC block 402 has expired, the current LLC block 402 is discarded, the subsequent or second LLC block 404 occurring before the next incompletely received LLC block (e.g., LLC block 406) is forwarded to the higher layer, and the receive buffer window is advanced to begin at the first incompletely received RLC block (e.g., RLC block 28) of the next incompletely received LLC block (e.g., LLC block 406). At this point, LLC block 406 becomes the new current or first incompletely received LLC block in the receive buffer window.

Next, since these steps are performed at the receiving terminal, the receiving terminal needs to indicate these actions to the transmitting terminal so that the transmitting terminal can advance its corresponding transmit buffer window accordingly. In preferred form, in order to avoid changes to known standards for GPRS/EGPRS, the receiving terminal simply sends an acknowledgement (ACK) to the transmitting terminal (Step 320) at its next opportunity that indicates that the discarded LLC block and any forwarded LLC block/s were completely received. Note that the receiving terminal sends an acknowledgement of the RLC blocks of the discarded LLC block, even though not all of these RLC blocks were received (e.g., RLC block 22 was never received). By acknowledging receipt, this indicates to the transmitting terminal to stop attempting to retransmit those RLC blocks and advance its corresponding re-transmit buffer. On the other hand, in some embodiments, the decision to drop RLC blocks may be made at the transmitting terminal; however, this requires a change in the GPRS/EGPRS standard to allow a message to be sent to the receiving terminal indicating that packets are to be dropped. Several embodiments in which the decision to drop RLC blocks is performed at the transmitting terminal are described with reference to FIGS. 12–13.

Figure 8:
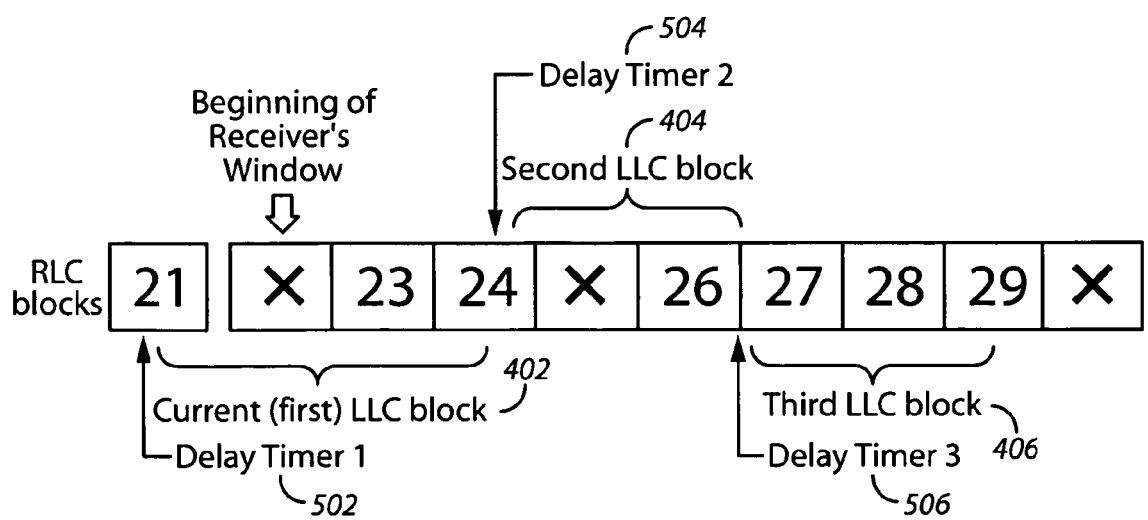
FIGS. 8–10 are buffer diagrams illustrating another embodiment of radio link control.
Figure 9:
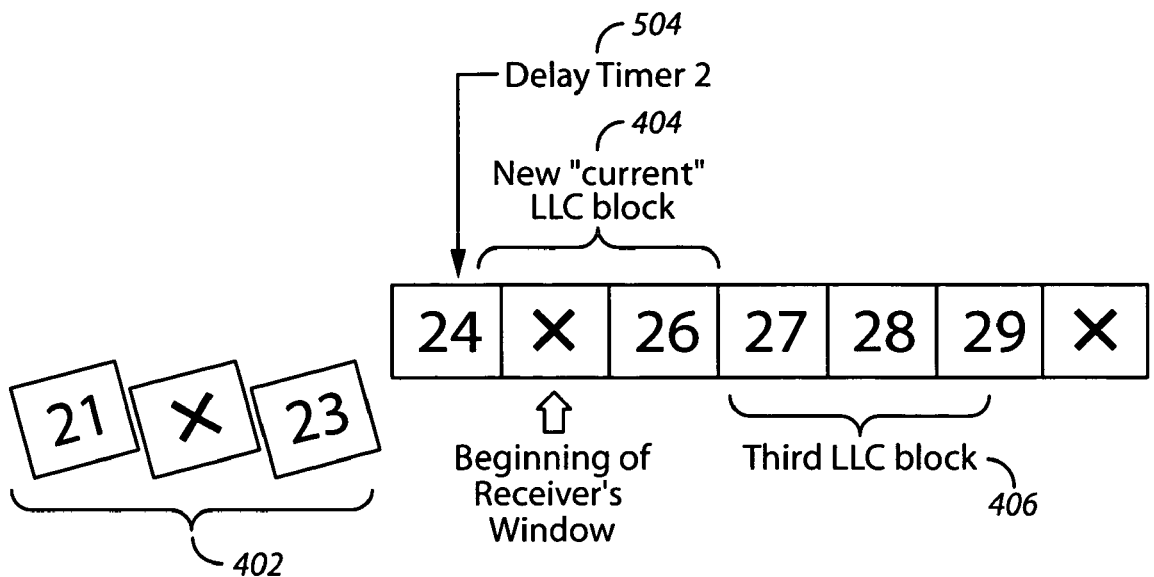
Figure 10:
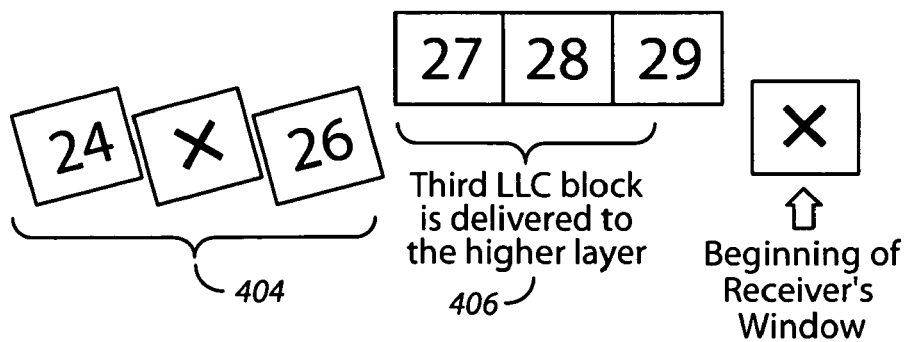

Steps 308–318 are repeated until the current LLC block 402 is completely received (then delivered to the higher layer) or an incomplete LLC block is encountered for which the delay timer has not yet expired. Furthermore, as described above, in some cases, the advancing the buffer window does not necessarily result in the forwarding of a completely received LLC block to the LLC layer. For example, as illustrated in FIG. 8, the completely received subsequent LLC block is the third LLC block 406 and it does not immediately follow the current LLC block 402. The delay timer 502 of the current LLC block has expired (Step 312); thus, the current LLC block 402 is discarded (Step 314). FIG. 9 shows that the buffer window has then advanced to the next incompletely received LLC block (Step 316), which in this case, is the second LLC block 404 occurring prior in sequence to the subsequent completely received LLC block 406; thus, no LLC blocks are forwarded to the LLC layer per Step 318. At this point, the beginning of the receive buffer window of FIG. 9 starts at the first incompletely received RLC block (i.e., RLC block 25) of the new current LLC block 404. Again, since there is a subsequent completely received LLC block 406 (Step 310), the timer for the new current LLC block 404 is checked (Step 312). If the timer has not expired (Step 312), no action is taken until the new current LLC block 404 is completely received or until the delay timer for the new current LLC block 404 expires. However, if the timer has also expired (Step 312), as illustrated in FIG. 10, then the new current LLC block 404 is discarded (Step 314), the buffer window is advanced to the next incompletely received LLC block starting at RLC block 30 (Step 316), and the completely received subsequent RLC block 406 is forwarded to the higher layer (Step 318). Again, in order that the transmitting terminal adjust its corresponding retransmit buffer window, an acknowledgement is sent to the transmitting terminal acknowledging receipt of the RLC blocks for incompletely received and discarded LLC blocks 402, 404 and for completely received and forwarded RLC block 406 (Step 320).

It is noted that in some embodiments, Step 318 may result in multiple completely received LLC blocks being forwarded to the LLC layer. For example, if there is a completely received LLC block in the buffer window and the timer has expired for the current LLC block, the current LLC block is discarded and the buffer window is advanced until it reaches the next incompletely received LLC block, and in the process forwards any intervening completely received LLC blocks to the higher layer.

It is noted that in some systems using these embodiments, such as in GPRS/EGPRS, only the boundaries between successive LLC blocks are indicated in the header of a given RLC block and there is no information on the RLC block header about which LLC block each RLC block belongs to. Therefore if one of the incompletely received RLC blocks happens to be a block that contains the boundary between two successive LLC blocks, the receiving terminal will be unaware that a new LLC block has started. As a consequence, while attempting to drop a current LLC block, it is possible to drop more than one actual LLC block, if the RLC block that contains the boundary between the current LLC block and the next is missing. For example, if RLC block 24 of FIGS. 4–6 were missing, then the receiving terminal would recognize the current LLC block 402 as including RLC blocks 21, 22, 23, 24, 25 and 26. Thus, while attempting to drop the current LLC block 402 (Step 314), both LLC blocks 402 and 404 would be dropped and the receive buffer window would be advanced to the next LLC block 406. However, in some embodiments, it may still be possible to recognize an LLC boundary even if the boundary RLC block is not completely received. For example, in EGPRS, when an RLC block contains an error in its payload the header is kept, and therefore it is possible, even when a block is missing, to be aware that it contained a boundary between LLC blocks.

In an alternative embodiment, the process of FIG. 3 can be modified to allow the application on the receiver side to trigger the drop of an LLC block. More specifically, if the LLC layer has not received an LLC block for some time from the lower layer or it otherwise has a need for data, the higher layer application signals to the RLC layer that the delay the application is experiencing is becoming unacceptable and instructs the RLC layer to drop delayed LLC blocks and/or forward any completely received LLC blocks. In one implementation, the higher layer application sets a "data needed" flag in the RLC layer. In this embodiment, whenever the RLC layer detects a completely received LLC block in the receive buffer window (Step 310), the RLC checks to see if the "data needed" flag is set (optional Step 322 illustrated in dashed lines). If the data flag is not set (Step 322), no action is taken and the process continues (back to Step 308). If the data flag is set (Step 322), then the current LLC block is discarded (Step 314), the receive buffer window is advanced (Step 316) and any appropriate completely received LLC block/s are forwarded to the higher layer (Step 318). Note that if there is no completely received LLC block in the buffer window (the answer to Step 310 is "no"), no action is taken even if the "data needed" flag is set, since even if the receiver buffer window is advanced, there would be no data to be delivered to the higher layer.

In another alternative embodiment, the process of FIG. 3 can be modified to check the timer expiration values for all LLC blocks in the receive buffer window (Step 312), instead of checking the delay timer for only the current LLC block 402. In this case, all RLC blocks that correspond to any incompletely received LLC blocks having expired delay timers would be discarded. For example, as shown in FIG. 8, this alternative embodiment checks the delays timers for both the current LLC block 402 and the second LLC block 404, even if the delay timer for the current LLC block 402 has not expired. The reason behind this is that it is possible the timer of the second LLC block 404 has expired when the timer of the first LLC block 402 has not yet expired, and it is desired to prevent the transmitting terminal from trying to send RLC blocks that belong to an expired LLC block. In this case, dropping the expired second LLC block 404 (and acknowledging the second LLC block) increases the efficiency of the air interface.

In further embodiments, the process of FIG. 3 is modified such that the delay tolerance value received in Step 302 is updated dynamically. For example, at any time, an updated delay tolerance value may be signaled from the higher layer application and stored as the new current delay tolerance. Additionally, there may be a separate delay tolerance stored for different LLC blocks.

It is noted that in some embodiments, it is possible that an IP packet, or network PDU (N-PDU), is segmented into several SNDCP/LLC blocks or frames, even though in most cases an N-PDU will fit into one SNDCP/LLC block. If an N-PDU is segmented, in one embodiment, the process may be further modified to treat the LLC blocks that belong to the same N-PDU the same way, e.g., if a decision is made to discard one LLC block belonging to a given N-PDU due to delays, then any other LLC blocks belonging to the same N-PDU are also discarded. In another embodiment, the expiration value estimates for all LLC blocks that belong to the same N-PDU are considered the same and; thus, are all dropped when the timer expires.

By following the processes described, LLC blocks that are delayed beyond the currently stored delay tolerance of the higher layer application for those LLC blocks are dropped to provide improved throughput and free bandwidth while avoiding needless retransmission attempts. These embodiments focus on delay, not retransmission count, and further focus on delay to a higher layer application as opposed to delay within the RLC layer. These embodiments are most beneficial to applications that prefer a higher packet loss at lower delay, such as streaming applications, push-to-talk (PTT) and voice over internet protocol (VoIP), for example. Additionally, most end-to-end higher layer applications are typically unaware of the RLC retransmissions and these applications often deploy independent mechanisms to deal with packet loss. For example, applications based on TCP set a retransmit timer to deal with dropped packets. Also present are real-time (non-TCP) applications with error recovery mechanisms at the receiver to deal with dropped packets. Accordingly, even though some packets will be dropped by the RLC layer according to these embodiments, given these higher layer mechanisms to handle packet loss, there is little value in RLC layer attempting to deliver packets beyond a given threshold.

The process of FIG. 3 may be performed as a set of instructions that are performed in dedicated hardware, firmware or in software using a processor or other machine to execute the instructions to accomplish the given steps.

Figure 11:
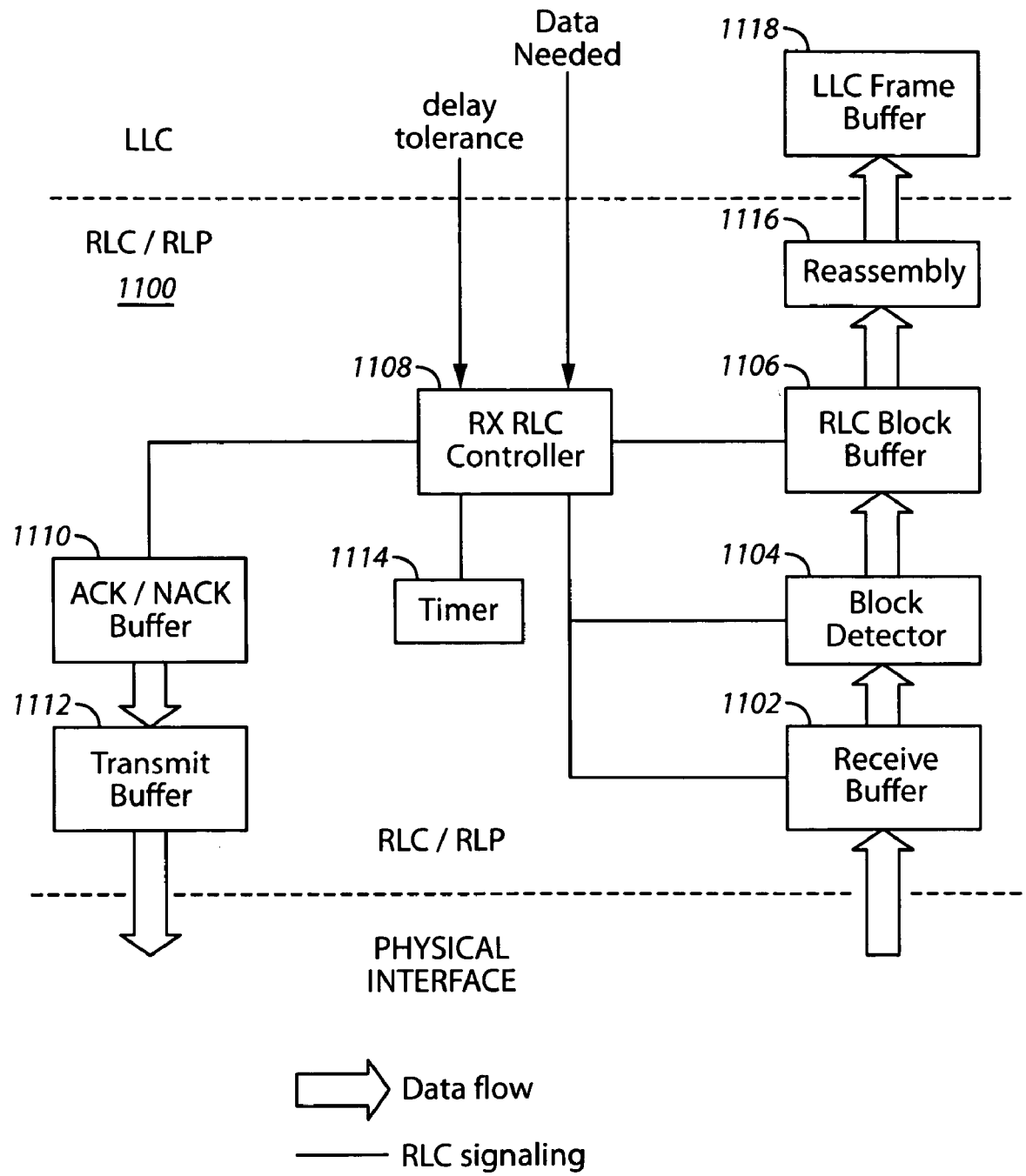
FIG. 11 is a functional block diagram of a radio control link layer of an embodiment in which radio link control is implemented at a receiving communication terminal.

Referring next to FIG. 11, a functional block diagram is shown of an embodiment in which radio link control is implemented at a receiving communication terminal. For example, the processes of FIG. 3 may be implemented by the radio link control layer 1100 of FIG. 11.

RLC blocks are received over the physical interface, which in preferred form is an air interface, and placed in the receive buffer 1102. The block detector 1104 determines if received RLC blocks are received in error or are missing. The block detector 1104 places correctly received RLC blocks in the RLC block buffer 1106 to await reassembly. In several embodiments, the RLC block buffer 1106 includes the receive buffer window, such as represented in FIGS. 4–10. In accordance with the process of FIG. 3, the block detector 1104 analyzes the header information on each received RLC packet and detects the start of each received LLC block (Step 306), i.e., the block detector determines the time of arrival of the beginning of a received LLC block. If an RLC block is incorrectly/erroneously received or missing, the block detector 1104 signals to the RLC controller 1108, which copies the missing or not received RLC block into an ACK/NACK buffer 1110, and a NACK (i.e., a retransmit request) is transmitted back to the transmitting terminal in an acknowledgment block, which is copied in the transmit buffer 1112, along with any other RLC blocks or other data that are being transmitted to the other communicating device. In this regard, since the communication terminal is a transceiver, the RLC layer 1100 also acts as the transmitting terminal for outgoing data blocks from the higher layers to the communicating terminal. The retransmit request generally takes priority in the transmit buffer 1112 over other RLC blocks waiting to be transmitted to the other communicating terminal.

Furthermore, when the block detector 1104 detects the start of a given LLC block, it signals to the RLC controller 1108, which starts a timer 1114 for that LLC block, such as in Step 307 of the FIG. 3. It is noted that in most embodiments, a separate timer is maintained for each LLC block received and buffered in the RLC block buffer 1106. Thus, although a single timer 1114 is illustrated, it is understood that multiple timers exist. The expiration value of each timer can be determined based on different criteria on a block by block basis. It is understood that the higher layer can mandate stingier or looser delay requirements by changing the expiration value of the timers at any time. That is, the higher layer application may dynamically change or update the delay tolerance in use on a LLC block-by-block basis. It is also noted that the timer 1114 may be implemented as multiple software timers or counters, or other devices known in the art. It is also understood that the timer may be implemented by storing a time of arrival of the first RLC block of each LLC block, and then comparing the difference between the current time and the stored arrival time to the current delay tolerance. If the difference is greater than or equal to the currently stored delay tolerance for the given LLC block, then the timer has expired.

In preferred form, in order to accomplish the process of FIG. 3, the RLC controller 1108 performs or causes to perform Steps 308, 310, 312, 314, 316, 318, 320 and 322. For example, in one embodiment, the RLC controller 1108 scans the RLC block buffer 1106 for any subsequent completely received LLC blocks (Steps 308, 310), checks to see if the timer for the current LLC block is expired (Step 312), optionally checks to see if a data needed flag is set (Step 322) as a result of instructions received from a higher layer application. For example, in determining whether a subsequent LLC block has been completely received, the RLC controller 1108 uses information from the block detector 1104 indicating which RLC blocks have been completely received. Additionally, the RLC controller 1108 outputs signaling to cause a current incompletely received LLC block to be discarded (Step 314) and advances the RLC block buffer window (Step 316). Furthermore, the RLC controller 1108 outputs signaling to cause any completely received subsequent LLC blocks to be forwarded to the higher layer (Step 318). In forwarding the completely received LLC block/s, the RLC blocks of the completely received LLC block are reassembled at reassembler 1116. The reassembler 1116 removes all headers and assembles the LLC block, which is then forwarded to the LLC frame buffer 1118. Additionally, the RLC controller 1108 causes an acknowledgement (ACK) to be sent for each discarded and/or forwarded LLC block, i.e., the RLC controller 1108 causes the ACK/NACK buffer 1110 to send an acknowledgement packet to the transmitting terminal, which is buffered in the transmit buffer 1112.

It is understood that in preferred form, the RLC layer 1100 includes a processor and memory storing instructions to implement the functional blocks of the RLC layer 1100. Further, it should be noted that many of the functional components of the RLC layer are separately illustrated; however, many may be integrated in together. It is understood that the RLC layer 1100 may be implemented as a set of instructions that are performed in dedicated hardware, firmware or in software using a processor or other machine to execute the instructions to accomplish the provided functionality.

Figure 12:
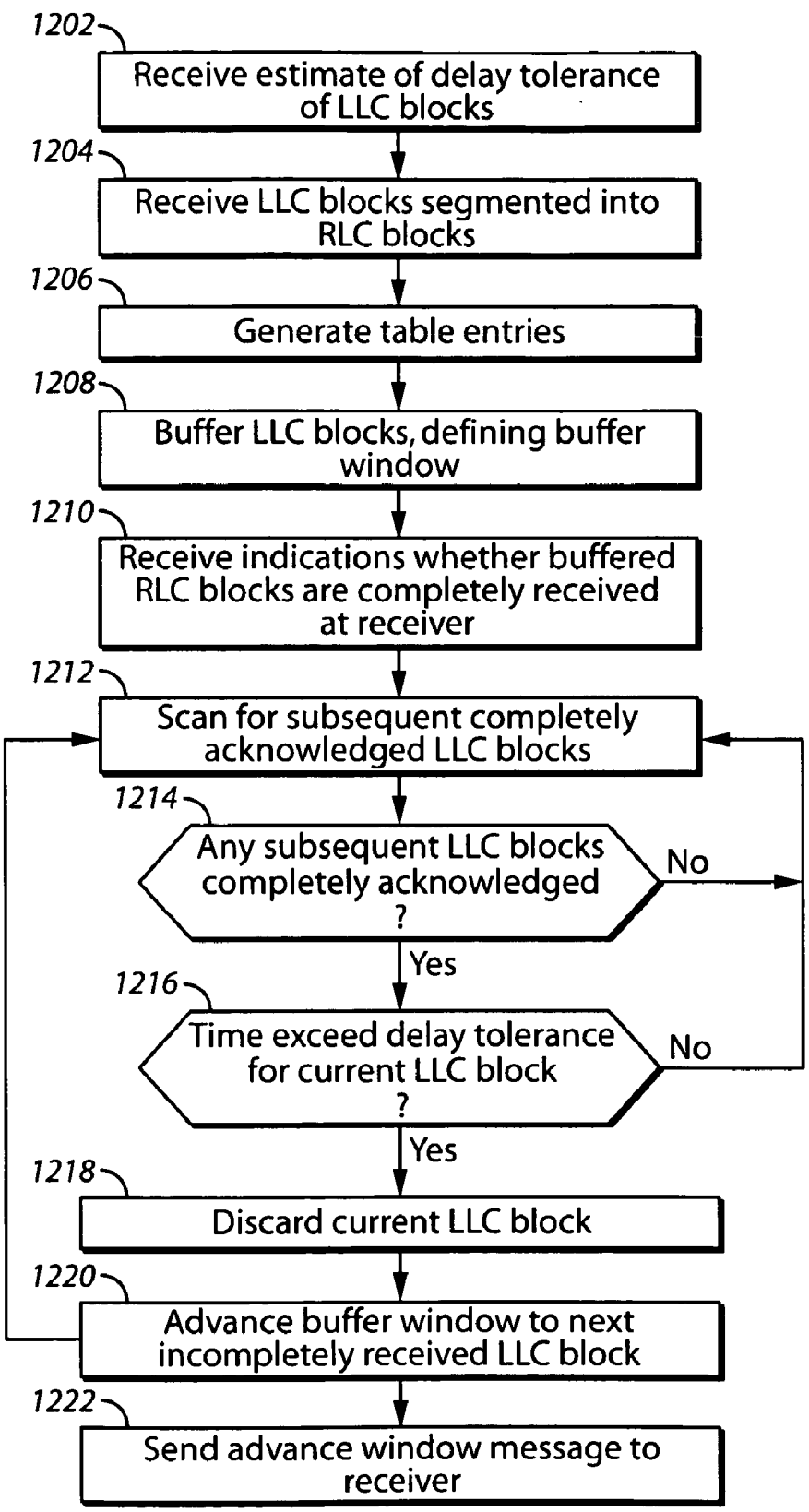
FIG. 12 is a flowchart of the steps performed in implementing radio link control at a transmitting communication terminal according to one embodiment.

Referring next to FIG. 12, a flowchart is shown of the steps performed in implementing radio link control at a transmitting communication terminal according to another embodiment. In embodiments according to the process of FIG. 12, all decisions to drop RLC blocks due to exceeding an estimate of delay tolerance of a higher layer application are performed entirely at the transmitting terminal, as opposed to by the receiving terminal in the embodiments of FIG. 3. For example, the process of FIG. 12 is suitable for a UMTS environment without any changes to the standard. Contrary to the GPRS/EGPRS, the transmitting terminal in UMTS is allowed to decide to drop a RLC block, and it can signal that decision to the receiving terminal by sending a Move Receiving Window command (in a STATUS message). It is noted that this process may also be implemented in other systems at the transmit side (e.g., in GPRS/EGPRS) with a modification to the standard to allow the transmitting terminal to send a move window message to the receiving terminal.

The logical flow of the embodiments of the process of FIG. 12 is similar to that of the embodiments of FIG. 3. Initially, similar to Step 302 as described in FIG. 3, an estimate of delay tolerance for a given LLC PDU is received (Step 1202). In preferred form, the estimate is for the maximum delay that can be tolerated for an LLC block (referred to as "maximum delay tolerance"). It is noted that this estimate can change at any time during the connection and can be set dynamically by the higher layer on an LLC block-by-block basis in order to reflect its changing delay requirements. Thus, any initial delay tolerance values may be updated or changed in use depending on the needs of the higher layer application.

Next, LLC blocks from the higher layer are segmented into RLC blocks and received in the RLC transmitter (Step 1204). For each segmented RLC block, table entries are created and stored in memory (Step 1206). In preferred form, for each RLC block an entry is created with the following fields: (a) arrival time; (b) delay tolerance (optionally, the maximum delay tolerance); (c) the starting block sequence number (BSN); and (d) a flag that indicates whether all the RLC blocks that comprise the LLC block have been positively acknowledged by the receiving terminal or not (this flag will be referred to as the "Completely Received" flag). Thus, the transmitting terminal maintains a table that contains delay information for each LLC block that is transmitted. In generating table entries, the LLC blocks are buffered to define a transmit buffer window (Step 1208), the transmit buffer window beginning with a current (or earliest) LLC block not completely acknowledged as received at the receiving terminal. In preferred form, such as illustrated in the buffer window 400 of FIG. 4, the buffer window begins at the first incompletely acknowledged RLC block (i.e., the first incompletely received RLC block) of the earliest or current incompletely acknowledged LLC block.

It is noted that the transmitting terminal maintains a buffer window for RLC retransmissions that corresponds to the receiving terminal's buffer window. Accordingly, many of the buffer diagrams of FIGS. 4–10 also apply to the process of FIG. 12. It is noted that generally, the transmit buffer window for purposes of tracking retransmissions is separate than the transmitting terminal's transmit buffer in which all packets or blocks are placed in queue to await transmission. Accordingly, all received RLC blocks from the higher layer are transmitted to the receiving terminal over the physical (e.g., air) interface. In response, the receiving terminal sends a control message back to the transmitting terminal indicating which transmitted blocks have been completely received (without error) and which blocks have not and should be re-transmitted. Typically, an ACK/NACK control message is sent back to the transmitting terminal. Thus, the RLC layer at the transmitting terminal receives an indication of whether buffered RLC blocks are completely acknowledged (received) or not (Step 1210). In preferred form, the "completely received" flag for a given LLC block is checked in the table if all RLC blocks of the given LLC block are acknowledged.

Upon receiving this indication, the transmitting terminal's table is scanned to detect any subsequent completely acknowledged LLC blocks (Step 1212). In one implementation, in order to determine if a given LLC block is completely acknowledged and thus completely received, the "completely received" flag is checked to see if it is set. Thus, a controller is able to determine if there is a subsequent LLC block that has been completely received based on information about whether transmitted RLC blocks are completely received, such as supplied to the transmitting terminal via acknowledgment messages from the receiving terminal. Note that in preferred form, a subsequent completely acknowledged LLC block can exist at the transmitting terminal's buffer only if it is completely acknowledged before the current or first LLC block. This is because all entries in the table that correspond to completely acknowledged LLC blocks, and are earlier than the one at the beginning of the transmitting terminal's buffer window, are deleted and the window is always advanced to begin with a current or earliest (i.e., first LLC block 402) LLC block that is incompletely received.

If there are no subsequent completely acknowledged LLC blocks in the buffer window/table (Step 1214), then no action is taken and the process returns to Step 1212.

If there is a subsequent completely acknowledged LLC block in the buffer window when the first or current LLC block has not been completely received (Step 1214), then check to see if the time delay for the current or first LLC block 402 exceeds the estimate of the delay tolerance (Step 1216). In one implementation, this check is performed by calculating the delay as the difference between the current time and the arrival time entered in the table corresponding to the current LLC block and comparing the difference to the currently stored value of the delay tolerance for the current LLC block. If the difference is greater than or equal to the currently stored value, then the time delay has been exceeded. Alternatively, similar to the approach of FIG. 3, a separate timer is started for each LLC block, the expiration value of each timer set to the delay tolerance as provided in Step 1202, and thus, Step 1216 will check to see if the timer has expired. It is also noted that in preferred form, the delay tolerance is the maximum delay tolerance for an LLC block as required by the higher layer application/s. This delay tolerance can change in an asynchronous manner reflecting the fact that the delay tolerance of the application layer can change at any time.

If the delay time has not been exceeded (Step 1216), then no action needs to be taken and the process returns to Step 1212.

If the delay time has been exceeded for the current LLC block (Step 1216), the current LLC block is discarded (Step 1218) and the buffer window is advanced until the beginning of the buffer window reaches the next incompletely acknowledged (incompletely received) LLC block in the buffer window (Step 1220). For example, in one implementation, when discarding and advancing, the process flushes or disregards all RLC blocks with a block sequence number (BSN) between the starting BSN in the current entry in the table and the starting BSN in the next entry in the table and moves to the next entry in the table including entries for any subsequent completely acknowledged LLC blocks until it reaches the next incompletely acknowledged LLC block for which the time delay is less than the provided delay tolerance. It is noted that since this occurs at the transmitting terminal instead of at the receiving terminal, the process does not forward any completely acknowledged LLC blocks, it simply removes then from the table and buffer window. Thus, the process of FIG. 12 is similar to that illustrated in FIGS. 4–10, however, all LLC blocks illustrated as being forwarded are instead discarded as they have been received and acknowledged by the receiving entity. It is noted that similar to that described in FIG. 3, when the buffer window advances to the next incompletely acknowledged LLC block, then the next incompletely received LLC block becomes the "new" current incompletely acknowledged LLC block.

Once the buffer window is advanced (Step 1220), the process continues back to Step 1212 and also sends an advance window control message to the RLC layer of the receiving terminal (Step 1222). This is because the transmitting terminal and the receiving terminal both maintain RLC buffer windows. These windows need to correspond to each other to prevent the receiving terminal from sending NACKs for an RLC block it thinks is missing, but was really discarded at the transmitter and not transmitted/re-transmitted. In one implementation, the message is identical to that specified in 9.2.2.11.7 of 3G TS 25.322, i.e., the Move Receiving Window Super field. In some embodiments, a new move window message (modification to the standard) is created and sent to the receiving terminal.

In further embodiments, the process of FIG. 12 is modified such that the delay tolerance value received in Step 1202 is updated dynamically depending on the needs of the higher layer application. For example, at any time, an updated delay tolerance value may be signaled from the higher layer application and stored as the new current delay tolerance. Additionally, there may be a separate delay tolerance stored for different LLC blocks.

It is noted that in some embodiments, Steps 1218 and 1220 may result in multiple completely received LLC blocks being discarded if there are multiple completely acknowledged LLC blocks in between the current incompletely received and expired LLC block and the next incompletely received LLC block.

In an alternative embodiment, the process is modified to check if the delay has been exceeded for all LLC blocks that wait in queue for transmission, or are already segmented and their corresponding RLC blocks are in the RLC buffer window (Step 1216). Thus, all expired LLC blocks will be discarded (Step 1218) and the buffer window adjusted accordingly (Step 1220). In one implementation, this process may be expressed mathematically. For example, using the notation:

$N_1, N_2, \ldots, N_n$ is the number of NACKED RLC blocks for LLC blocks 1, 2, . . . , n;

$S_1, S_2, \ldots, S_n$ is the number of remaining RLC blocks for LLC blocks 1,2, . . . , n (note that this is the actual number of RLC blocks if the LLC block is segmented and the corresponding RLC blocks are in the RLC buffer window, or an estimate based on the length of the LLC block and the coding scheme most likely to be used (it can also be the minimum number of RLC blocks that are required if the highest rate coding scheme is used));

$t_1, t_2, \ldots, t_n$ is the arrival times of LLC blocks 1, 2, . . . , n in milliseconds;

t is the current time in milliseconds;

$a_1, a_2, \ldots, a_n$ is the delay tolerance for LLC blocks 1, 2, . . . , n in milliseconds; and $T_b$ is the time required to transmit one RLC block, based on the current transmission rate.

Based on this notation, if for LLC block i:

$$t + \sum_{k=1}^{i} (S_k + N_k) \cdot T_b > (t_i + a_i)$$

then the LLC block i should be discarded because its transmission time will be higher than the timer expiration value. Thus, if it will take longer than the delay tolerance to completely transfer a given LLC block under current transmission conditions, then the given LLC block is discarded.

The process of FIG. 12 may be performed as a set of instructions that are performed in dedicated hardware, firmware or in software using a processor or other machine to execute the instructions to accomplish the given steps.

Figure 13:
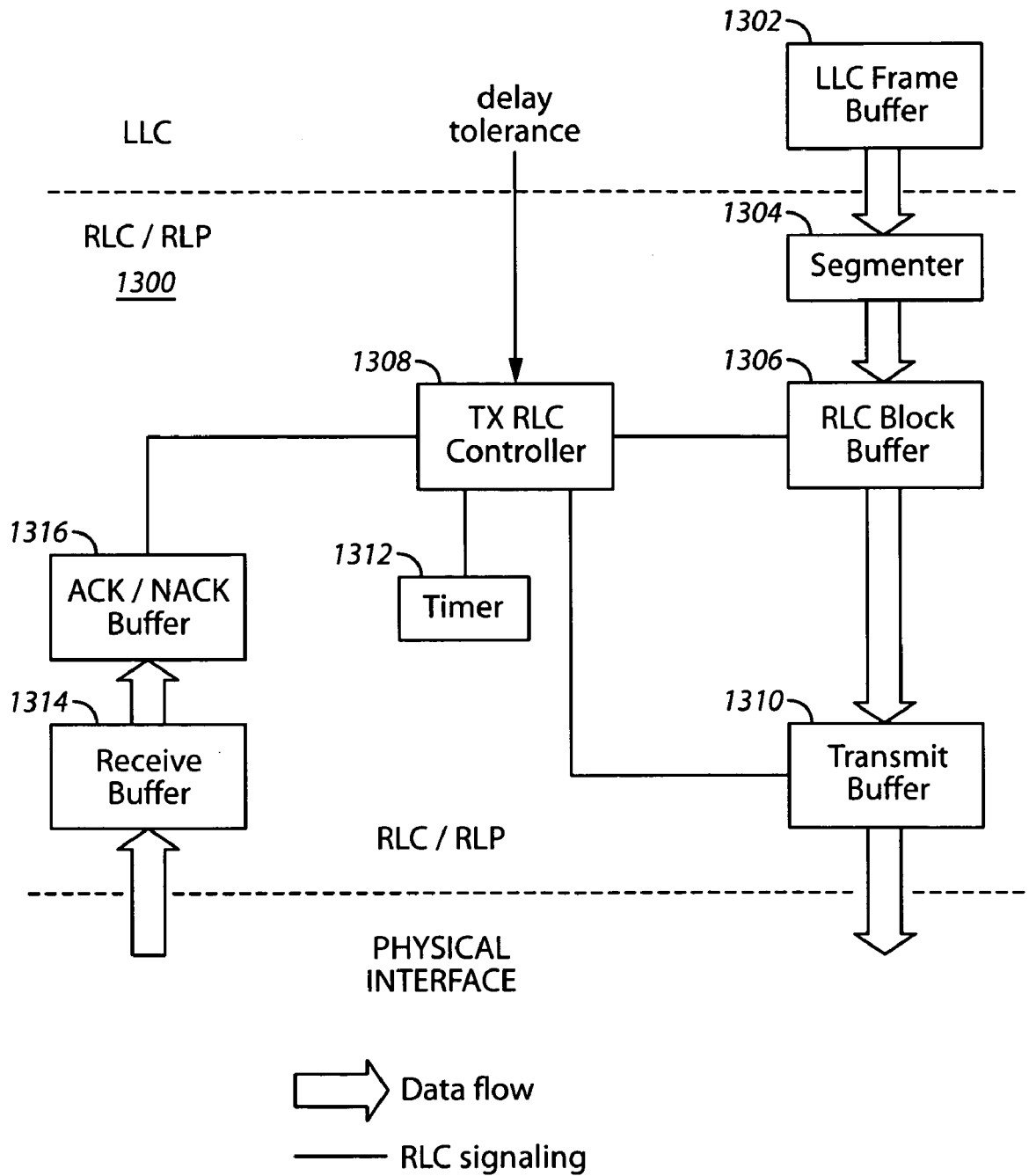
FIG. 13 is a functional block diagram of a radio control link layer of an embodiment in which radio link control is implemented at a transmitting communication terminal.

Referring next to FIG. 13, a functional block diagram is shown of an embodiment in which radio link control is implemented at a transmitting communication terminal. For example, the processes of FIG. 12 may be implemented by the radio link control layer of FIG. 13.

RLC blocks from the higher layer to the RLC layer 1300 are received from an LLC frame buffer 1302 (also referred to as an LLC block buffer). These LLC blocks are segmented at a segmenter 1304. At this point, under the control of an RLC controller 1308, LLC blocks segmented into RLC blocks are buffered in an RLC block buffer 1306. For example, the RLC controller 1308 generates table entries for each LLC block (e.g., Step 1206 of FIG. 12) and buffers the RLC blocks in an RLC transmit block buffer (e.g., Step 1208 of FIG. 12). The RLC controller 1308 uses a timer 1312 (or clock) to provide the times for entry into the tables. Alternatively, the timer 1312 represents a separate timer with possibly a separate expiration value for each LLC block in the RLC transmit buffer window.

All RLC blocks and other data blocks, such as retransmitted blocks and other data, are placed in a transmit buffer 1310 for transmission over the physical (e.g., air) interface to the receiving terminal. In response, acknowledgement messages are received over the physical interface in a receive buffer 1314, along with other traffic from the receiving terminal. This acknowledgement message/s is buffered in an ACK/NACK buffer 1316. Accordingly, the RLC controller 1308 inspects the ACK/NACK buffer to determine which transmitted RLC blocks were positively acknowledged or not, and can set the appropriate flags in the table (e.g., the "completely received flag" for a given LLC block). According to known procedures, RLC blocks which are NACKed are generally re-transmitted either indefinitely or until a retransmit count has been exceeded.

According to several embodiments, the RLC controller 1308 performs or causes the performance of modified RLC ARQ processes. For example, the RLC controller 1308 scans the table/window of the RLC block buffer 1306 to detect any subsequent completely acknowledged LLC blocks (e.g., Step 1212). For example, in determining whether a subsequent LLC block has been completely acknowledged/received, the RLC controller 1308 uses information from the ACK/NACK buffer 1316 indicating which RLC blocks have been completely received. If there are no subsequent completely acknowledged LLC blocks in the buffer window/table (e.g., Step 1214 of FIG. 12), then no action is taken. If there is a subsequent completely acknowledged LLC block in the buffer window when the first or current LLC block has not been completely received, the RLC controller 1308 checks to see if the time delay for the current or first LLC block 402 exceeds the currently stored value of the estimate of the delay tolerance for the current LLC block (e.g., such as described in Step 1216 of FIG. 12). If the delay time has not been exceeded, then no action needs to be taken.

If the delay time has been exceeded for the current LLC block, RLC controller 1308 causes the current LLC block to be discarded (e.g., Step 1218 of FIG. 12) and advances the buffer window until it reaches the next incompletely acknowledged LLC block in the buffer window (e.g., Step 1220 of FIG. 12). In order to inform the receiving terminal of this event, the RLC controller 1308 causes an advance window message to be placed in the transmit buffer 1310 to be transmitted to the receiving terminal.

Similar to that described in the embodiments of FIGS. 1–11, in the process of FIG. 12 and the implementation of FIG. 13, LLC blocks that are delayed beyond the currently stored estimate of the delay tolerance of the higher layer application for those LLC blocks are dropped to provide improved throughput and free bandwidth while avoiding needless retransmission attempts. These embodiments focus on delay, not retransmission count, and further focus on delay to a higher layer application as opposed to delay within the RLC layer. These embodiments should be most beneficial to applications that prefer a higher packet loss at lower delay, such as streaming applications, push-to-talk (PTT) and voice over internet protocol (VoIP), for example. There is considerable overall benefit in dropping some delayed packets at the RLC layer according to these embodiments, given that higher layer mechanisms exist to handle packet loss.

Similar to the RLC 1100 of FIG. 11, the RLC layer 1300 includes a processor and memory storing instructions to implement the functional blocks of the RLC layer 1300. Further, it should be noted that many of the functional components of the RLC layer are separately illustrated; however, many may be integrated in together. It is also understood that the RLC layer 1300 may be implemented as a set of instructions that are performed in dedicated hardware, firmware or in software using a processor or other machine to execute the instructions to accomplish the provided functionality.

Figure 14:
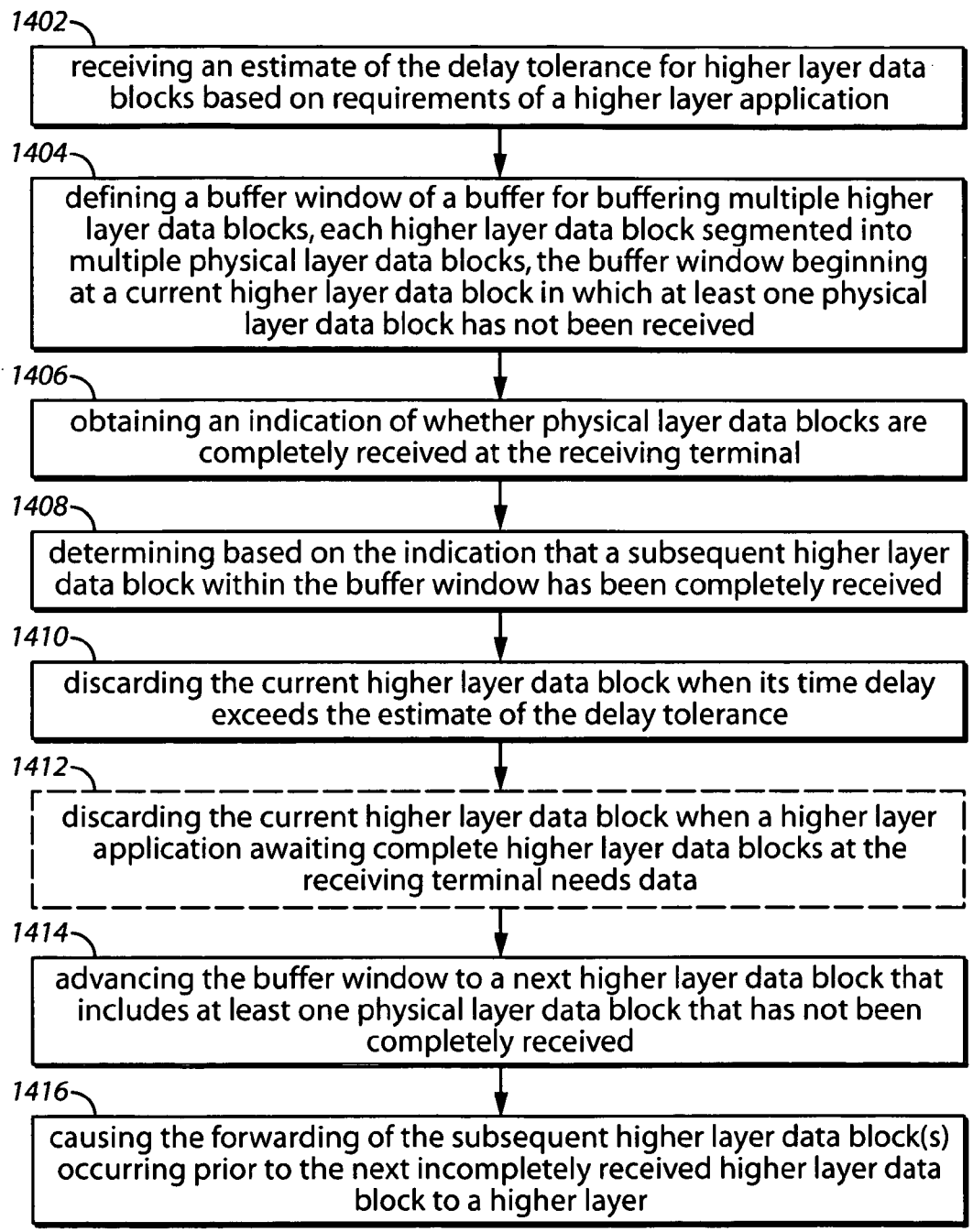
FIG. 14 is a flowchart of the steps performed in implementing radio link control that may be implemented at either a transmitting communication terminal or a receiving communication terminal according to another embodiment.

Referring next to FIG. 14, a flowchart is shown of the steps performed in implementing radio link control that may be implemented at either a transmitting communication terminal or a receiving communication terminal according to another embodiment. Thus, the process as generically defined covers the embodiments of the FIGS. 3 and 12 in a broader sense.

In the broader characterization, the RLC controls for ARQ are described in terms of a data link layer control of ARQ for physical layer data blocks (or data units) transmitted via a physical interface or communication medium to a receiving terminal relative to higher layer data blocks. The higher layer data blocks received from the higher layer are each segmented into the physical layer data blocks at the data link layer for transmission by the physical layer of the transmitting terminal and then reassembled back into the higher layer data blocks once completely received at the receiving terminal. For example, in many wireless radio applications, the higher layer data blocks are LLC blocks or LLC PDUs, which are segmented into RLC blocks or RLP blocks by the RLC layer/RLP layer. These RLC blocks are transmitted over the physical interface and are thus, referred to generically as physical layer data blocks. Additionally, it is understood that while in preferred form, the physical interface is an air interface over which wireless radio communications are sent, it is understood that other physical interfaces may employ these techniques. For example, lossy wireline mediums or air mediums over which optical transmissions are sent.

Initially, an estimate of the delay tolerance for higher layer data units is received based on requirements of a higher layer application (Step 1402). Whether the process is implemented at the transmitter side or the receiver side, this delay tolerance value is needed. This value can be updated at any time, to reflect changing requirements or changing conditions. This can happen directly by the higher layer application, or by the data link layer itself. If the delay tolerance is updated, the updated value is stored as the current delay tolerance value. Additionally, it is possible that different higher layer data blocks will have a different stored delay tolerance value. Next, a buffer window of a buffer is defined for buffering multiple higher layer data blocks, with each higher layer data block segmented into multiple physical layer data blocks, and the buffer window beginning at a current higher layer data block in which at least one physical layer data block has not been received (Step 1404). For example, in the RLC process of Step 304 of FIG. 3, the receiving terminal defines a receive window buffer and window. On the transmit side, for example, Steps 1204 and 1206 generate table entries for and buffer LLC blocks.

Depending on the embodiment, either a timer or counter is started for each buffered higher layer data block or an arrival time is determined for each buffered higher layer data block. Again, as described above, when referring to starting a timer, any known means to start and implement a timer is intended. For example, storing an arrival time and determining the time elapsed since the arrival time implements a timer. This is done to track how long the higher layer data block remains incompletely received/acknowledged in the data link layer in order to discard higher layer data blocks for which the timer runs out or for which the delay tolerance is exceeded.

Next, an indication is obtained of whether physical layer data blocks are completely received at the receiving terminal (Step 1406). On the receive side, this step is typically performed by the data link layer that determines if any received physical layer data blocks (e.g., RLC blocks) are not received or are erroneously received, e.g., at a block detector. With this information, the data link layer can determine whether a higher layer data block occurring after the current incompletely received higher layer data block has been completely received. On the transmit side, the indication is obtained in one embodiment, by receiving an acknowledgement message from the receiving terminal that indicates which physical layer data blocks are correctly received and which were not. With this information, the data link layer determines whether a higher layer data block occurring after the current higher layer data block has been completely received. Accordingly, the next step is to determine that a subsequent higher layer data block within the buffer window has been completely received based on this indication (Step 1408).

Then, the current higher layer data unit is discarded when its time delay in the data link layer exceeds the estimate of the delay tolerance (Step 1410). For example, on the receive side, in one embodiment, a timer is started upon reception of the beginning of each higher layer data block. The expiration of the timer is set to the estimated delay tolerance value. Thus, when a subsequent higher layer data block is completely received, and the timer for the current higher layer data block expires based on the currently stored estimate for the delay tolerance for the current higher layer data block, the current higher layer data block is discarded (e.g., similar to Steps 310, 312 and 314 of FIG. 3). Similarly, by comparing the difference between an arrival time of the first physical layer data block of the current higher layer data block and the current time to the current value of the delay tolerance, it can be determined if the time delay has been exceeded for the current higher layer data block (in other words, the timer has expired for the current higher layer data block). On the transmit side, in one implementation, the arrival time for each higher layer data block is recorded. Thus, when a subsequent higher layer data block is completely acknowledged, and the delay time beyond the arrival time for the current higher layer data block exceeds the currently stored, estimated delay tolerance value, the current higher layer data block is discarded (e.g., similar to Steps 1214, 1216 and 1218 of FIG. 12). In another implementation on the transmit side, the current higher layer data block is discarded when a timer expires that was started at the arrival of the current higher layer data block and was set to expire at the delay tolerance, in the presence of a subsequent completely acknowledged higher layer data block. Again, in some embodiments, the stored delay tolerance may dynamically vary on a higher layer data block-by-block basis as distacted by the higher layer application.

An optional step that may be performed instead of Step 1410 on the receive side is discarding the current higher layer data block when a higher layer application awaiting complete higher layer data blocks at the receiving terminal needs data (Step 1412). In one embodiment, the higher layer application signals to the data link layer that it needs data, e.g., by setting a data needed flag similar to Step 322 of FIG. 3.

Next, the buffer window is advanced to a next higher layer data block that includes at least one physical layer data block that has not been completely received (Step 1414). Then, the next step is to cause the forwarding of the subsequent higher layer data block(s) occurring prior to the next incompletely received higher layer data block to the higher layer (Step 1416). For example, on the receive side, the buffer window is advanced to the next incompletely received higher layer data block while at the same time forwarding any intervening completely received higher layer data blocks to the higher layer. Then an acknowledgement is sent to the transmitting terminal so that it can adjust its buffer window accordingly. In one embodiment, this is described as Steps 316, 318 and 320 of FIG. 3. On the transmit side, in one embodiment, the buffer window is advanced discarding the current higher layer data block and discarding any subsequent higher layer data block(s) occurring prior to the next incompletely received higher layer data block. However, the transmit side also causes the subsequent higher layer data blocks to be forwarded to the higher layer since it sends a move window message to the receive side, which then moves it's corresponding buffer window, discarding it's current incompletely received higher layer data block and forwarding any subsequent completely received higher layer data blocks to the higher layer until it reaches the next incompletely received higher layer data block as instructed by the move window message. In one embodiment, this is described in Steps 1220 and 1222 of FIG. 12.

The process of FIG. 14 may be performed as a set of instructions that are performed in dedicated hardware, firmware or in software using a processor or other machine to execute the instructions to accomplish the given steps. For example, the process of FIG. 14 may be implemented by the RLC layers of FIGS. 11 and 13.

Embodiments of the process of FIG. 14 may be implemented at the receiving terminal or the transmitting terminal. Higher layer data blocks (such as LLC blocks segmented into RLC or RLP blocks) that are delayed beyond the delay tolerance of a higher layer application are dropped to provide improved throughput and free bandwidth while avoiding needless retransmission attempts. These embodiments focus on delay, not retransmission count, and further focus on delay to a higher layer application as opposed to delay within a data link layer (such as the RLC layer). These embodiments should be most beneficial to applications that prefer a higher packet loss at lower delay, such as streaming applications, push-to-talk (PTT) and voice over internet protocol (VoIP), for example. There is considerable overall benefit in dropping some delayed packets at the RLC layer according to these embodiments, given that higher layer mechanisms exist to handle packet loss.

While the invention herein disclosed has been described by means of specific embodiments and applications thereof, numerous modifications and variations could be made thereto by those skilled in the art without departing from the scope of the invention set forth in the claims.

What is claimed is:

1. A method for control of automatic repeat requests between a transmitting terminal and a receiving terminal comprising:

defining a buffer window of a buffer at a communication device, the buffer window to buffer multiple higher layer data blocks, each higher layer data block segmented into multiple physical layer data blocks, the buffer window beginning at a current higher layer data block in which at least one physical layer data block has not been received;

obtaining an indication of whether physical layer data blocks are completely received at the receiving terminal;

determining, based on the obtaining step, that a subsequent higher layer data block within the buffer window has been completely received;

forwarding completely received higher layer data blocks to a higher layer application when the higher layer application requires the data; and discarding the current higher layer data block when a time delay of the current higher layer data block exceeds an estimate of a delay tolerance corresponding to the higher layer application.

2. The method of claim 1 wherein the discarding step comprises:
discarding the current higher layer data block when the time delay of the current higher layer data block exceeds an estimate of a maximum delay tolerance corresponding to the higher layer application based on requirements of the higher layer application.

3. The method of claim 1 further comprising:
starting a timer corresponding to the current higher layer data block upon receipt of a first physical layer data block of the current higher layer data block;
setting an expiration of the timer to the estimate of the delay tolerance such that the current higher layer data block is discarded when the timer expires.

4. The method of claim 1 further comprising: storing an arrival time of the current higher layer data block; determining that a time elapsed since the arrival time exceeds the estimate of the delay tolerance such that the current higher layer data block is discarded when the delay time elapsed since the arrival time exceeds the estimate of the delay tolerance.

5. The method of claim 1 further comprising: advancing the buffer window to a next higher layer data block that includes at least one physical layer data block that has not been completely received.

6. The method of claim 5 further comprising: causing the subsequent higher layer data block to be forwarded to the higher layer.

7. The method of claim 5 wherein the buffer window is implemented at the receiving terminal and wherein the method further comprises:
causing an acknowledgement of the current higher layer data block to be sent to the transmitting terminal.

8. The method of claim 5 wherein the buffer window is implemented at the transmitting terminal and wherein the method further comprises: discarding the subsequent higher layer data block; and causing a move buffer window message to be sent to the receiving terminal.

9. The method of claim 1 wherein the step of forwarding further comprises:
checking whether the higher layer application awaiting complete higher layer data blocks at the receiving terminal needs data;
discarding the current higher layer data block when the higher layer application needs the data; and
causing the subsequent higher layer data block to be forwarded to the higher layer when the higher layer application needs the data.

10. The method of claim 1 wherein the discarding step further comprises:
discarding the current higher layer data block when the higher layer application does not requires the data in addition to when a time delay of the current higher layer data block exceeds an estimate of a delay tolerance corresponding to the higher layer application.

11. An apparatus for use in control of automatic repeat requests from a transmitting terminal to a receiving terminal comprising:
a buffer having a buffer window to buffer multiple higher layer data blocks, each higher layer data block segmented into multiple physical layer data blocks, the buffer window beginning at a current higher layer data block in which at least one physical layer data block has not been received; and
a controller adapted to obtain an indication of whether physical layer data blocks are completely received and determine based on the indication that a subsequent higher layer data block within the buffer window has been completely received; and
the controller adapted to cause the current higher layer data block to be discarded when the higher layer application does not requires data and a time delay of the current higher layer data block exceeds an estimate of a delay tolerance corresponding to a higher layer application.

12. The apparatus of claim 11 wherein the controller is adapted to discard the current higher layer data block when the time delay of the current higher layer data block exceeds an estimate of a maximum delay tolerance corresponding to the higher layer application based on requirements of the higher layer application.

13. The apparatus of claim 11 further comprising: a timer corresponding to the current higher layer data block and adapted to be started upon receipt of a first physical layer data block of the current higher layer data block; the timer having an expiration set to the estimate of the delay tolerance such that the current higher layer data block is discarded when the timer expires.

14. The apparatus of claim 11 wherein the controller is adapted to: store an arrival time of the current higher layer data block; and determine that a time elapsed since the arrival time exceeds the estimate of the delay tolerance such that the current higher layer data block is discarded when the delay time elapsed since the arrival time exceeds the estimate of the delay tolerance.

15. The apparatus of claim 11 wherein the controller is adapted to advance the buffer window to a next higher layer data block that includes at least one physical layer data block that has not been completely received.

16. The apparatus of claim 15 wherein the controller is adapted to cause the subsequent higher layer data block to be forwarded to the higher layer.

17. The apparatus of claim 15 wherein the apparatus is implemented at the receiving terminal and wherein the controller is adapted to cause an acknowledgement of the current higher layer data block to be sent to the transmitting terminal.

18. The apparatus of claim 15 wherein the apparatus is implemented at the transmitting terminal and wherein the controller is adapted to discard the subsequent higher layer data block and cause a move buffer window message to be sent to the receiving terminal.

19. The apparatus of claim 11 wherein the apparatus is implemented at the receiving terminal and the controller is adapted to:
check whether the higher layer application awaiting complete higher layer data blocks at the receiving terminal needs data;
discard the current higher layer data block when the higher layer application needs the data; and
cause the subsequent higher layer data block to be forwarded to the higher layer when the higher layer application needs the data.

20. An apparatus for use in control of automatic repeat requests from a transmitting terminal to a receiving terminal comprising:
means for defining a buffer window of a buffer at a communication device, the buffer window to buffer multiple higher layer data blocks, each higher layer data block segmented into multiple physical layer data blocks, the buffer window beginning at a current higher layer data block in which at least one physical layer data block has not been received;

means for obtaining an indication of whether physical layer data blocks are completely received at the receiving terminal;

means for determining, based on the obtaining step, that a subsequent higher layer data block within the buffer window has been completely received; and means for discarding the current higher layer data block when a higher layer application does not requires data and a time delay of the current higher layer data block exceeds an estimate of a delay tolerance corresponding to a higher layer application.

21. The apparatus of claim 20 wherein the means for discarding comprise:

means for discarding the current higher layer data block when the time delay of the current higher layer data block exceeds an estimate of a maximum delay tolerance corresponding to the higher layer application based on requirements of the higher layer application.

22. A method for control of automatic repeat requests between a transmitting terminal and a receiving terminal comprising:

defining a buffer window of a buffer at a communication device, the buffer window to buffer multiple higher layer data blocks, each higher layer data block segmented into multiple physical layer data blocks, the buffer window beginning at a current higher layer data block in which at least one physical layer data block has not been received;

obtaining an indication of whether physical layer data blocks are completely received at the receiving terminal;

determining, based on the obtaining step, that a subsequent higher layer data block within the buffer window has been completely received;

forwarding completely received higher layer data blocks to a higher layer application when the higher layer application requires the data; and sending a false acknowledgement to discard the current higher layer data block in the buffer window.

23. The method of claim 22 wherein the false acknowledgement is a signal to the transmitting terminal to falsify the current data block as completely received and to terminate retransmission process.

* * * * *